United States Patent [19]

Whitmore

[11] Patent Number: 4,519,565
[45] Date of Patent: May 28, 1985

[54] PAINT-BUCKET HOLDER

[76] Inventor: Richard L. Whitmore, Rte. 1, Box 292, Kenbridge, Va. 23944

[21] Appl. No.: 443,824

[22] Filed: Nov. 22, 1982

[51] Int. Cl.³ .............................................. A47G 29/02
[52] U.S. Cl. ..................................... 248/237; 248/137
[58] Field of Search ............... 248/362, 139, 140, 141, 248/142, 148, 154, 149, 311.2, 137; 220/94 R, 85 H; 211/81

[56] References Cited

U.S. PATENT DOCUMENTS

| 682,576 | 9/1901 | Smith | 248/141 |
|---|---|---|---|
| 989,104 | 4/1911 | Anderson | 248/148 X |
| 2,470,154 | 5/1949 | Fitzgerald | 248/141 |
| 2,561,845 | 7/1951 | Curry | 248/148 |
| 2,883,134 | 4/1959 | O'Halloran | 248/311.2 X |
| 2,913,207 | 11/1959 | Eash | 248/148 |
| 3,017,036 | 1/1962 | Albert et al. | 248/206.5 X |
| 3,321,170 | 5/1967 | Vye | 248/362 |
| 3,332,653 | 7/1967 | Hoelzel | 248/311.2 X |

FOREIGN PATENT DOCUMENTS

| 568264 | 1/1933 | Fed. Rep. of Germany | 248/148 |
|---|---|---|---|
| 745837 | 3/1956 | United Kingdom | 182/107 |

Primary Examiner—J. Franklin Foss
Attorney, Agent, or Firm—Griffin, Branigan & Butler

[57] ABSTRACT

A paint-bucket holder (12) to be used for painting housings made of ferric material includes a support frame having a base portion forming a mounting plane and an upright portion rigidly attached to the base portion having spaced swivel bucket attachments for coupling the upright portion to opposite sides of the upper end of a paint bucket (14) thereby allowing the bucket to swivel and remain upright for various positions of the support frame. Magnetic foot assemblies (24a–d ) are attached to the base portion for magnetically attaching the paint bucket holder to a facing (16) of the ferric material housing. The magnetic foot assemblies are spaced outside of the vertically-projected perimeter of the paint bucket. The base portion has a vertical clearance between side foot assemblies such that the paint bucket holder can stradle a standing seam (18) of the ferric-material housing (16). The upright portion comprises arms (30, 32, 34 and 36) having lateral grooves (38) cut in upper end portions thereof fastened together for swivelly attaching to handles (48) of paint buckets, thereby forming the swivel bucket attachments.

9 Claims, 6 Drawing Figures

PAINT-BUCKET HOLDER

BACKGROUND OF THE INVENTION

This invention relates generally to the art of painting, and more particularly, to a paint can holder to be used for painting sloped ferric-material housings, such as tin roofs, and metal storage tanks.

Supporting paint buckets on tin roofs has long been a problem for painters inasmuch as one cannot used such common devices as skags or spurs as are depicted in U.S. Pat. Nos. 989,104 to Anderson, 3,017,152 to Alpaugh, and German Patent No. 568,264. Often painters of tin roofs will simply hold paint cans in their hands the whole time, only being able to put the paint cans down when they come off the roofs. Painters of tin roofs will often attach two ladders end-to-end with rope and then drape the ladders over opposite sides of a peak of a roof. In such a situation it is possible to set a paint can down between ladder rungs, however, the paint can is then on an angle and paint can spill from the can where the roof is steep.

Several suggestions have been made for supporting paint cans on tin roofs in the past. In U.S. Pat. No. 789,034 to Jones a paint-can holder is wedged between two standing seams, or V-grooves as they are commonly called. In U.S. Pat. No. 789,640 to Wainwright, a paint-can holder is clamped onto one standing seam. Although both of these methods appear to be useful, they are not in common usage, probably because they are complicated and expensive to build and because they are difficult to move from one place to another on a roof. In this respect, when one uses either of these systems he, or someone else, must hold the paint bucket while the paint-bucket holder is being moved. A paint-bucket holder for painting tin roofs, metal tanks, and the like, must be easily movable, and cannot disturb the integrity of the surface on which it is supported. It is an object of this invention to provide such a paint-bucket holder.

It is a further object of this invention to provide a paint-bucket holder which can not only be used for tin roofs, but which can also be used for painting large tanks and ships.

It is a further object of this invention to provide a paint-bucket holder which is relatively uncomplicated and inexpensive to construct and to use.

SUMMARY

According to principles of this invention, a paint-bucket holder for painting tin roofs, large tanks, ships, and the like, includes a frame with a relatively wide base portion and an upright portion rigidly attached thereto. The base portion has relatively widely separated permanent magnets mounted thereon as feet for attaching the paint-bucket holder to a ferric facing while the upright portion includes swivel mounts at ends opposite the base portion for attaching a paint bucket thereto but allowing the paint bucket to maintain an upright attitude. The magnetic feet are positioned so that when the paint-bucket holder is on a flat surface the magnetic feet lie outside of a vertically-projected perimeter of the paint bucket. The paint-bucket holder provides a vertical clearance between side magnetic feet so that the paint-bucket holder can straddle standing seams. The paint-bucket holder swivel mounts are formed by fastening two beams together having slots from opposite directions with the bucket handle mounted in the slots.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
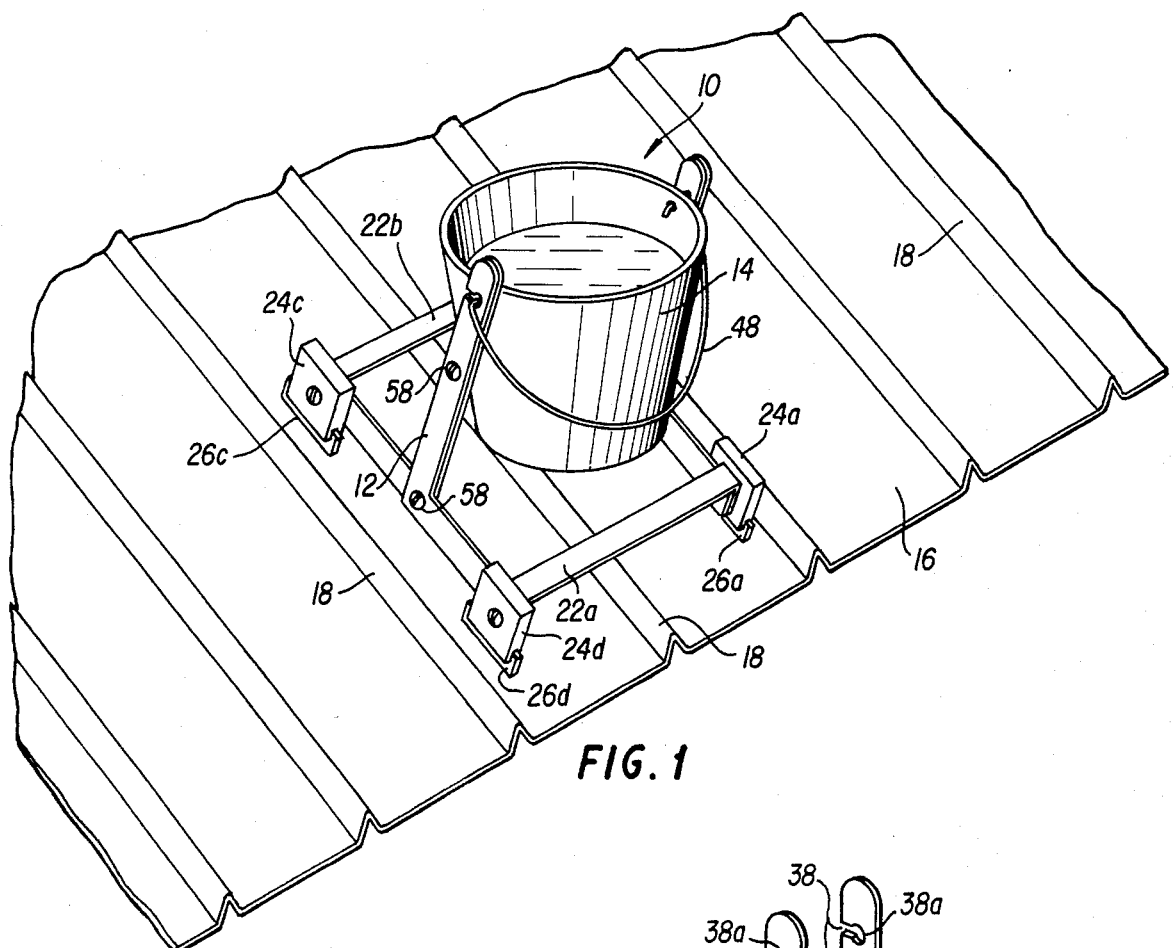
FIG. 1 is an isometric view of a paint-bucket holder employing principles of this invention supported by a tin roof.

A paint-bucket assembly 10 of FIG. 1 includes a paint-bucket holder 12 and a paint bucket 14. This device is shown as being mounted on a tin roof 16. The tin roof 16, as do most tin roofs, has standing seams 18, sometimes called V-grooves, running downwardly from the peak (not shown) of the roof to the eaves 19. In the embodiment of FIG. 1, the paint bucket 14 is of a special variety in that it is not the type that one normally buys paint in, however, this invention could also be used for supporting a paint can in which paint is usually bought.

The paint-bucket holder 12 includes four flat angle irons 20a–d, two spacer irons 22a and b and four magnetic foot assemblies 24a–d fastened together by bolts.

Figure 3:
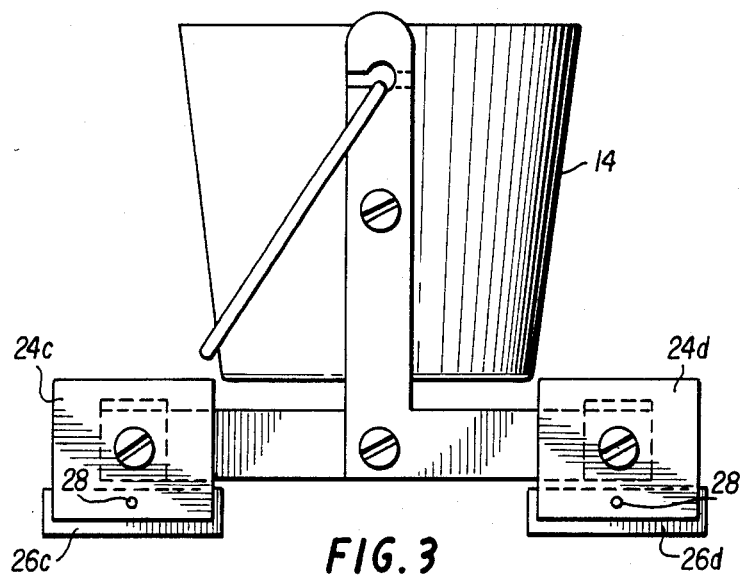
FIG. 3 is a side view of the paint-bucket holder of FIG. 1.
Figure 4:
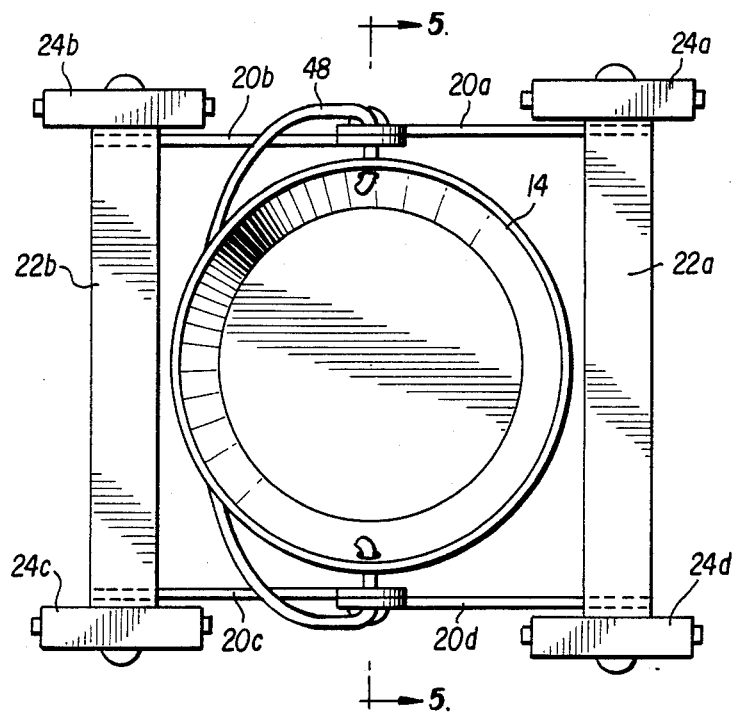
FIG. 4 is a top view of the paint-bucket holder of FIG. 1.
Figure 5:
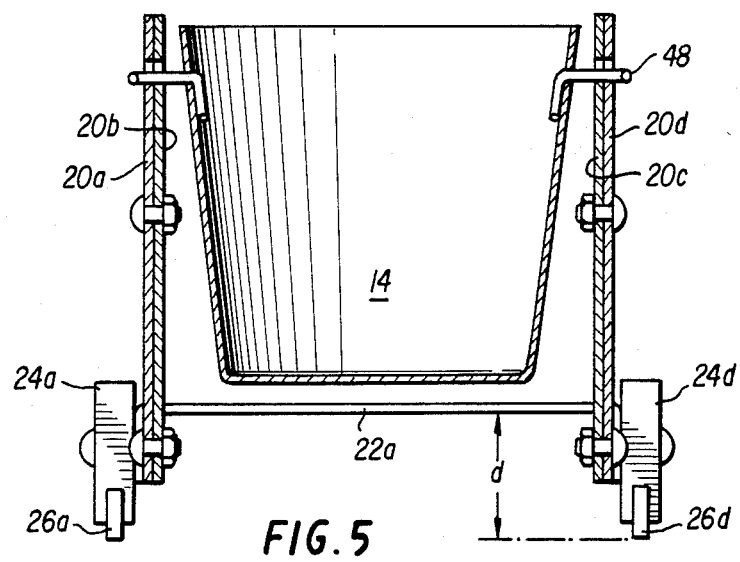
FIG. 5 is a sectional end view of the paint-bucket holder of FIG. 1, taken on line 5—5 of FIG. 4.

Each of the magnetic foot assemblies 24a–d includes a respective permanent magnet 26a–d attached thereto by a pivot attachment 28 (see FIG. 3). The pivot attachments 28 allow the magnets 26a–d to have a small amount of pivotal motion relative to housings in order to allow flat contact with irregular surfaces and therefore a more secure seating of the magnets 26a–d on the surfaces.

Figure 2:
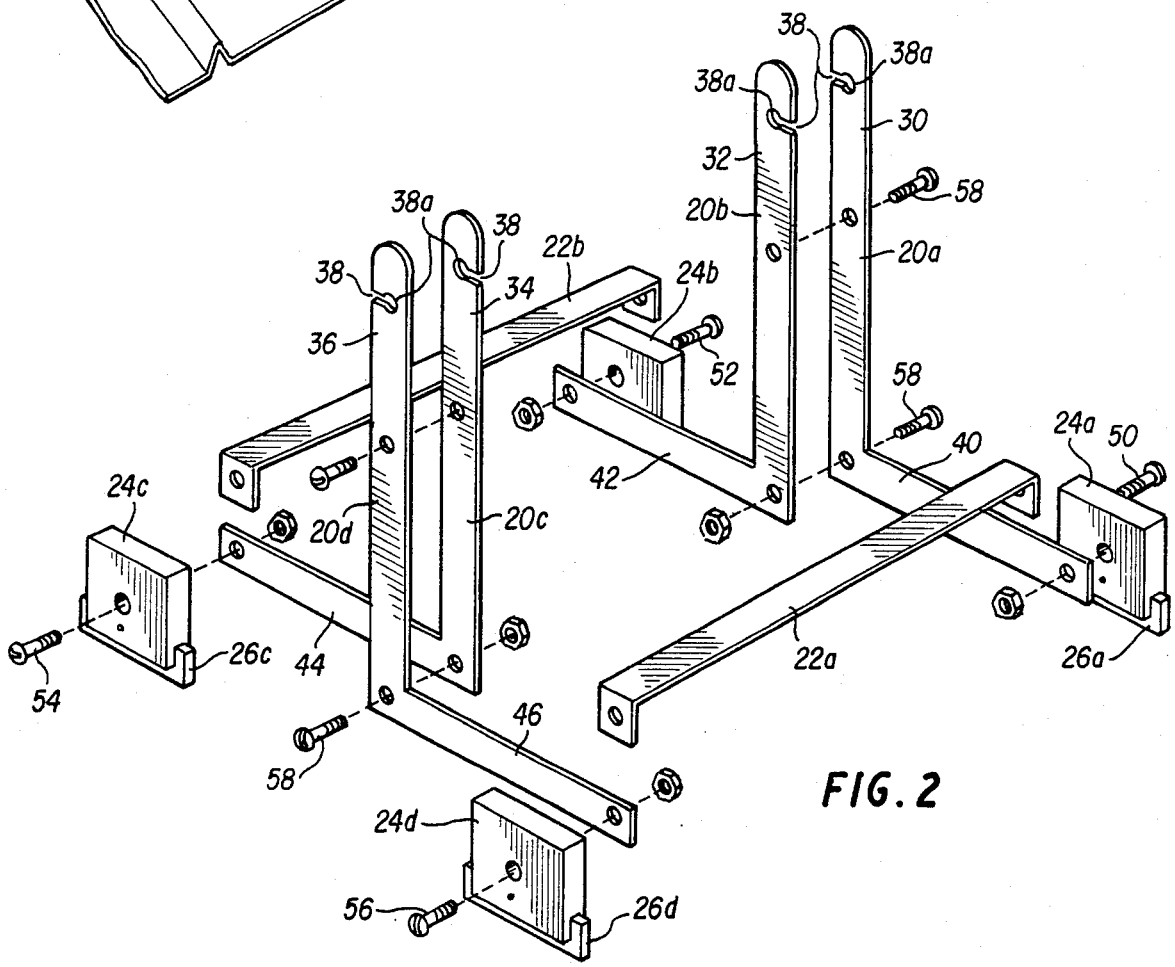
FIG. 2 is an exploded, isometric view of the paint-bucket holder of FIG. 1 without the bucket.

The various parts are assembled as is depicted in FIG. 2 to form the assembly depicted in FIGS. 1, 3, 4 and 5. That is, respective arms 30 and 32 of flat angle irons 20a and 20b, for example, are bolted together to form one upright member of the paint-bucket holder while respective arms 34 and 36 of the angle irons 20c and 20d are bolted together to form another upright member of the paint-bucket holder 12. Each of the arms 30–36 includes near its upper end a keyhole-shaped slot 38 on the opposite edge from which the other arm 40–46 extends. Thus, each of the angle irons 20a–d is identical, however, when they are bolted together, they are arranged opposite to one another, with the arms 40 and 42, and 44 and 46, extending away from one another. Thus, a bail-type handle 48 of the bucket 14 can be placed in one of the slots 38 prior to bolting the top bolt of the arms 30 and 32, for example, together and then the other slot 38 is slipped over the handle 48 prior to bolting the top bolt. Once the arms 30 and 32 are bolted together, the handle is positioned in the enlarged hole 38a of the two slots 38 and cannot get out. Thusly held, the handle, and the bucket 14 are allowed to swivel.

The spacers 22a and b are mounted to ends of the arms 40–46 of the flat angle irons 20a–d by the same screws 50–56 as mount the magnetic foot assemblies 24a–d to the ends of the arms 40–46. It should be noted that the spacers 22a and b are bent upwardly so that the spanning portions thereof are spaced a distance from any surface on which the magnetic support assembly is supported. In practice, the distance d (see FIG. 5) that the spanning portions of spacers 22a and b are above a support surface should be at least three quarters of an inch, and preferably it should be at least an inch so as to clear ridges, such as the standing seams 18. In this manner, a painter must not be particularly careful when painting as to where he puts down his paint-bucket holder. In this regard, the spanning portions of the spacers 22a and b run parallel with the axis about which the bucket 14 swivels. In addition, the spacers 22a and b should be sufficiently short so that the paint-bucket holder can be placed between two standing seams 18 of a normal tin roof. Of course their length must also be coordinated with the size of the bucket 14.

In operation, one fills the bucket 14 with a reasonable amount of paint and then picks up the paint bucket assembly by rotating the handle 48 upwardly and lifting. He picks up the entire paint-bucket holder, with the filled bucket of paint and proceeds to the paint location, possibly on a slanted tin roof as is depicted in FIG. 1. Once at a paint location, the painter sets the paint-bucket holder onto the tin roof 16 with the paint-bucket holder oriented so that weight of the paint in the bucket 14 can rotate the bucket to bring it to an upright position as is depicted in FIG. 1, in other words, the swivel axis of the paint bucket 14 is across the slope so that the paint bucket bottom can rotate in a tangential direction down the slope. As the painter sets the apparatus on the roof 16 in the orientation depicted in FIG. 1, magnets 26b and c will come into contact with the roof first while magnets 26a and d will come into contact with the roof 16 second. The bucket 14 will automatically swivel to an upright position. In this supported position, the magnets 26a–d are magnetically attracted to the ferric tin roof 16 and are thereby held thereto. With regard to this "magnetic gripping", the weight of the paint in the bucket 14 will tend to cause the paint-bucket holder 12 to rotate about magnets 26a and d as a fulcrum axis. In other words, a force will be applied to try to pull magnets 26b and c upwardly from the roof. However, the magnetic attraction of these magnets 26b and c is sufficiently strong to prevent such rotation.

Once the painter has finished painting the area of the roof near the first place on which he set the paint-bucket holder 12, he lifts the handle 48 upwardly and in doing so, causes magnets 26a and d to first release from the tin roof 16 and magnets 26b and c to release second. The user then simply puts the paint bucket holder, with the attached paint can, at a new location on the tin roof.

Should a user need to change the paint bucket 14, for example to mount the paint-bucket holder 12 on a paint bucket in which the paint is purchased, he need only release bolts 58, separate the arms 30 and 32 and 34 and 36 and then put them back together again with the new paint-bucket handle in the slots 38.

In the preferred embodiment of the invention the permanent magnets 26a–d are of equal strength, however in an alternate embodiment of the invention, two of the mounting foot assemblies, for example, mounting foot assemblies 24a and d, either do not have magnets at all, or have very weak magnets. In this respect, when the paint-bucket holder is supported on a roof, most of the holding is done by uphill magnets 26b and c, with foot assemblies 24a and d mostly forming fulcrums. By using smaller magnets, or no magnets, at foot assemblies 24a and d, the paint-bucket holder 12 can be more easily lifted from a ferric surface. However, this embodiment has the disadvantage that one must be careful to ensure the proper orientation of the paint-bucket assembly before he puts it down.

Figure 6:
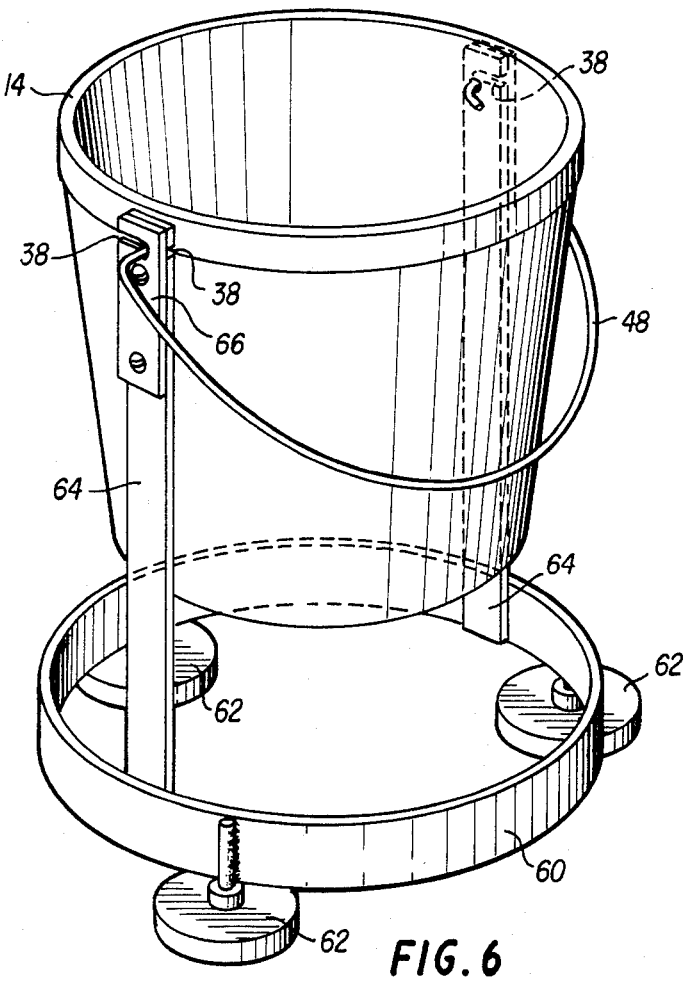
FIG. 6 is an isometric view of a second embodiment paint-bucket holder employing principles of this invention.

FIG. 6 depicts an alternate embodiment in which a base 60 is round rather than rectangular and only three permanent magnets 62 are arranged about this circular base 60. In the depicted embodiment, upright frame members 64 have slots 38 at their upper ends and auxiliary members 66 having opposite slots 38 are bolted thereto in order to capture the handle 48 of the bucket 14. Although the device depicted in FIG. 6 is vastly superior to prior-art tin roof bucket holders, it has some disadvantages relative to the rectangular embodiment depicted in the other drawings in that when the base is round one is not as easily reminded as to the proper attitude for setting down the paint-bucket holder as with the rectangular model. Also, with only three magnets, the attitude at which one sets this apparatus down will determine how many holding magnets are on the upper side; thus, sometimes the paint-bucket holder will hold more firmly than at other times. Of course it would be possible to use four magnets also for the FIG. 6 embodiment.

It is noted that in both embodiments when the paint-bucket holders are placed on horizontal surfaces, the magnets lie outside of a vertically-projected perimeter of the paint bucket 14. This is desirable in order to give the paint-bucket holder sufficient support when it is being attracted to a tin roof, ship, metallic tank, or the like.

It will be understood by those skilled in the art that although this invention has been described in terms of use with a slanted tin roof, it can also be used on a vertical side of a ship or tank.

It will be appreciated by those skilled in the art that the frame of the FIGS. 1–5 embodiment of this invention is uniquely uncomplicated in structure, having basically only two parts, flat angle irons 20a–d and spacer bars 22a and b. That is, the flat angle irons 20a–d are all identical, thereby reducing production costs.

While the invention has been particularly shown and described with reference to a preferred embodiment, it will be understood by those skilled in the art that various changes in form and detail may be made therein without departing from the spirit and scope of the invention. For example, fasteners other than bolts could be used, or parts could be welded. Also, the base of the FIG. 6 embodiment could be changed considerably to provide more clearance for standing seams in the manner of the FIGS. 1–5 embodiment.

The embodiment of the invention in which an exclusive property or privilege are claimed are defined as follows:

1. A paint-bucket holder for painting inclined surfaces of housings made of a ferric material comprising:

a support frame, said support frame including a rectangularly-shaped base portion, which is sufficiently narrow that it can fit between standing seams of most tin roofs, said base portion forming four mounting areas approximately at the laterally-displaced corners of the rectangle thereby defining a mounting plane for supporting said frame on a facing of a ferric-material housing being painted, said support frame further including an upright portion rigidly attached to said base portion and extending laterally from said mounting plane, said upright portion having at a position opposite said mounting plane, approximately half way between lines respectively connecting said first and second adjacent mounting areas and said second and third mounting areas, two spaced swivel bucket attachment means for coupling said upright portion to opposite sides of the upper portion of a paint bucket thereby allowing the bucket to swivel so that when the paint bucket holder is placed on an inclined surface with said first and second mounting means being uphill and said third and fourth mounting means being downhill its bottom swings perpendicularly away from said line connecting said first and second mounting areas perpendicularly toward said line connecting said third and fourth mounting areas and said bucket thereby remains upright for various positions of the support frame; and, at least two magnetic foot assemblies one being attached to said base portion at said first corner mounting area and the other being attached to said base portion at said second corner mounting area and each including a loosely held permanent magnet for contacting said facing of said ferric material housing and attaching thereto by means of magnetic attraction, said mounting areas being positioned sufficiently far apart such that when said mounting plane is arranged horizontally the magnetic foot assemblies lie far outside of a vertically-projected perimeter of the upright paint bucket with the bucket being approximately equidistant from said line connecting said first and second mounting areas and said line connecting said third and fourth monitoring areas.

2. A paint-bucket holder as in claim 1 wherein said frame provides vertical clearance between said at least two magnetic foot assemblies of at least three quarters of an inch.

3. A bucket-paint holder as in claim 1 wherein said two spaced swivel bucket attachment means rotatably attach said upright portion to bail-type handles of said buckets and allow said buckets to rotate at said attachments.

4. A paint bucket holder as in claim 3 wherein said upright position is formed by attaching to substantially identical flat members that are oppositely oriented, together in side-by-side overlapping relationship.

5. A paint-bucket holder as in claim 4 wherein said members are L-shaped.

6. A paint-bucket holder as in claim 5 wherein there is vertical clearance between opposite sides of said base portion thereby allowing said base portion to straddle a standing seam of a normal tin roof.

7. A paint-bucket holder as in claim 1 wherein there is vertical clearance between opposite sides of said base portion thereby allowing said base portion to straddle a standing seam of a normal tin roof.

8. A paint-bucket holder as in claim 1 wherein said upright portion is formed by attaching two arms together side-by-side, each of said arms having a lateral slot therein, each of said slots extending to the edge of its arm so as to form an open mouth of said slot but the arms being arranged so that the mouths of the slots open in opposite directions, the slots overlapping, whereby a bail-type bucket handle can be rotatably mounted in the overlap of the slots but is prevented from leaving the open mouths of each of the slots by the other arm, said ball being removable from the slots by separating the arms.

9. A paint-bucket holder for painting housings made of a ferric material comprising:

a support frame, said support frame including a base portion forming mounting areas at laterally-displaced positions thereby defining a mounting plane for supporting said frame on a facing of a ferric-material housing being painted, said support frame further including an upright portion rigidly attached to said base portion and extending laterally from said mounting plane, said upright portion having at a position opposite said mounting plane two spaced swivel bucket attachment means for coupling said upright portion to opposite sides of the upper portion of a paint bucket thereby allowing the bucket to swivel and remain upright for various positions of the support frame, each of said spaced swivel bucket attachment means comprising a first flat bar having a first lateral slot therein, said slot extending to the edge of the bar so as to form an open mouth of said slot and a second flat bar having a second slot which when said second flat bar is attached side-by-side to said first flat bar overlaps with said first lateral slot but which covers the mouth of said first slot, said spaced swivel bucket attachment means being spaced from one another slightly further than the cross sectional dimension of a paint bucket, whereby a bail type bucket handle, close to its attachments to the bucket can be mounted in the overlap of the slots to allow free rotation of the bucket but is prevented from leaving the slots, said bail being removable from the slots by separating the arms.

* * * * *